United States Patent
Yoo et al.

(10) Patent No.: US 11,277,579 B2
(45) Date of Patent: Mar. 15, 2022

(54) IMAGE SENSORS AND IMAGE PROCESSING SYSTEMS USING MULTILEVEL SIGNALING TECHNIQUES

(71) Applicant: SAMSUNG ELECTRONICS CO., LTD., Suwon-si (KR)

(72) Inventors: Kwi Sung Yoo, Seoul (KR); Eun Young Jin, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 18 days.

(21) Appl. No.: 16/678,384

(22) Filed: Nov. 8, 2019

(65) Prior Publication Data

US 2020/0077042 A1 Mar. 5, 2020

Related U.S. Application Data

(63) Continuation of application No. 14/728,355, filed on Jun. 2, 2015, now Pat. No. 10,506,189.

(30) Foreign Application Priority Data

Jun. 11, 2014 (KR) ........................ 10-2014-0070657

(51) Int. Cl.
| | |
|---|---|
| *H01L 27/00* | (2006.01) |
| *H04N 5/3745* | (2011.01) |
| *H04N 5/243* | (2006.01) |
| *H04N 5/378* | (2011.01) |

(52) U.S. Cl.
CPC ......... *H04N 5/37455* (2013.01); *H04N 5/243* (2013.01); *H04N 5/378* (2013.01)

(58) Field of Classification Search
CPC ..... H04N 5/243; H04N 5/37455; H04N 5/378
USPC ...................................................... 250/208.1
See application file for complete search history.

(56) References Cited

U.S. PATENT DOCUMENTS

| | | |
|---|---|---|
| 7,129,978 B1 | 10/2006 | Brehmer et al. |
| 7,586,431 B2 | 9/2009 | Muramatsu et al. |
| 7,679,665 B2 | 3/2010 | Egawa et al. |
| 7,911,522 B2 | 3/2011 | Egawa et al. |

(Continued)

FOREIGN PATENT DOCUMENTS

| | | |
|---|---|---|
| JP | 2002-010146 | 1/2002 |
| JP | 2002-199281 | 7/2002 |

(Continued)

*Primary Examiner* — Georgia Y Epps
*Assistant Examiner* — Kevin Wyatt
(74) *Attorney, Agent, or Firm* — Sughrue Mion, PLLC

(57) ABSTRACT

An image sensor includes a pixel array configured to generate a plurality of pixel signals, an analog to digital converter circuit coupled to the pixel array and configured to generate respective digital codes responsive to respective ones of the pixel signals, a plurality of memories, respective ones of which are configured to store respective bits of the digital codes, a signal processing circuit coupled to a plurality of memories and configured to generate analog signals responsive to the stored bits, each of the analog signals corresponding to multiple ones of the stored bits, and a comparator circuit configured to compare the analog signals to respective ones of a plurality of reference signals to generate digital signals corresponding to the multiple ones of the stored bits. Related image processing systems and methods are also described.

17 Claims, 17 Drawing Sheets

(56) References Cited

U.S. PATENT DOCUMENTS

| | | | |
|---|---|---|---|
| RE42,918 E | | 11/2011 | Fossum et al. |
| 8,253,835 B2 | | 8/2012 | Egawa et al. |
| 9,088,741 B2 | | 7/2015 | Sumi et al. |
| 9,521,351 B1 | * | 12/2016 | Endsley ............... H04N 5/3532 |
| 2004/0080637 A1 | | 4/2004 | Nakamura et al. |
| 2007/0069929 A1 | | 3/2007 | Mallinson |
| 2007/0194962 A1 | | 8/2007 | Asayama et al. |
| 2012/0104235 A1 | | 5/2012 | Sumi et al. |
| 2012/0147205 A1 | * | 6/2012 | Lelescu ................ G06T 3/4053 |
| | | | 348/218.1 |
| 2012/0176501 A1 | | 7/2012 | Yoo et al. |
| 2012/0176523 A1 | | 7/2012 | Yoo et al. |
| 2013/0089175 A1 | | 4/2013 | Mo et al. |
| 2014/0152686 A1 | * | 6/2014 | Narasimha ............. G06T 5/008 |
| | | | 345/589 |
| 2015/0070544 A1 | * | 3/2015 | Smith ............... H01L 27/14627 |
| | | | 348/297 |

FOREIGN PATENT DOCUMENTS

| | | |
|---|---|---|
| JP | 2006-174245 | 6/2006 |
| JP | 2006352597 | 12/2006 |
| JP | 2010-57019 A | 3/2010 |
| KR | 10-2002-0059257 | 7/2002 |
| KR | 10-2005-0054841 A | 6/2005 |
| KR | 10-2006-0059036 | 6/2006 |
| KR | 10-2011-0062326 A | 6/2011 |

* cited by examiner

FIG. 4

| D1_1 | D1_2 | WS1i | WS1ib |
|---|---|---|---|
| 0 | 0 | 0 | 1.5Io |
| 0 | 1 | 0.5Io | 1.0Io |
| 1 | 0 | 1.0Io | 0.5Io |
| 1 | 1 | 1.5Io | 0 |

IMAGE SENSORS AND IMAGE PROCESSING SYSTEMS USING MULTILEVEL SIGNALING TECHNIQUES

CROSS-REFERENCE TO RELATED APPLICATIONS

This application is a Continuation Application of U.S. application Ser. No. 14/728,355 filed Jun. 2, 2015, which claims priority under 35 U.S.C. § 119(a) from Korean Patent Application No. 10-2014-0070657 filed on Jun. 11, 2014, the disclosure of which is hereby incorporated by reference in its entirety.

BACKGROUND

Embodiments of the inventive concept relate to semiconductor devices and, more particularly, to image sensors, image processing systems and methods of operating the same.

Image sensors are devices that convert an optical image into an electrical signal. Image sensors include charge coupled device (CCD) image sensors and complementary metal-oxide-semiconductor (CMOS) image sensors.

A CMOS image sensor (or a CMOS image sensor chip) may be described as an active pixel sensor manufactured using CMOS semiconductor processes. A typical CMOS image sensor includes a pixel array including a plurality of pixels. Each of the pixels includes a photoelectric conversion element that converts an optical signal into an analog electrical signal and an additional circuit that converts the analog electrical signal into a digital signal.

A typical CMOS image sensor may include, for example, analog to digital converter (ADC) circuitry configured to convert pixel signals into multi-bit digital codes, which may be stored in memory. The store digital codes may be transferred from the memory to a data bus in a bit by bit manner. For example, in response to a first address, a first bit of a first digital code corresponding to a first pixel may be transferred to the data bus, in response to a second address, a first bit of a second digital code corresponding to a second pixel may be transferred to the data bus, in response to a third address, a first bit of a third digital code may be transferred to the data bus, and so on.

The number of pixels, the resolution of an analog-to-digital converter, and a high frame rate are important factors that determine the quality of images processed by the CMOS image sensor. These factors may correlate with the data transfer efficiency of the data bus.

Data bus frequency may be increased in order to increase the data transfer efficiency of the data bus. However, when the data bus frequency increases, there may be a problem in restoring data in a receiver due to interference during data transmission. In addition, when the resolution of the analog-to-digital converter circuitry is increased and a multi-channel data bus is used, more silicon area may be required to form the analog-to-digital converter and the multi-channel data bus. As a result, the die size of the CMOS image sensor chip may increase. Therefore, the die size may need to be reduced by decreasing the silicon area in order to increase gross die or net die. Here, gross die or net die may be defined as the number of semiconductor chips that can be formed in a single wafer.

SUMMARY

Some embodiments of the inventive concept can provide an image sensor having increased efficiency for transfer of data over a data bus, which can reduce silicon area needed to form the data bus and thus reduce die size. Further embodiments provide image processing systems including such sensors and related methods of operating image sensors.

Some embodiments of the inventive concept provide methods of operating an image sensor. The methods include storing a plurality of 1-bit signals in respective ones of a plurality of 1-bit storage devices, generating weighted sum signals having at least three different levels using the 1-bit signals stored in the 1-bit storage devices, and comparing respective ones of a plurality of reference signals with the weighted sum signals to generate a plurality of digital signals. The methods may further include generating the 1-bit signals responsive to a pixel signals output from a plurality of pixels.

In some embodiments, the methods may include converting pixel signals output from the plurality of pixels into digital codes, wherein each of the 1-bit signals are from the same positions in the digital codes. In some embodiments, the 1-bit signals may be generated based on pixel signals output from pixels and the 1-bit signals are included in respective digital codes corresponding to respective ones of the pixel signals and are adjacent to each other in the digital codes.

According to some embodiments, generating the weighted sum signal may include adjusting a plurality of weighted sum coefficients and generating the weighted sum signals using a result of the adjustment and the 1-bit signals.

In some embodiments, generating the weighted sum signals may include decoding a column address and activating a column selection signal and generating a weighted sum signal using the column selection signal and the 1-bit signals. In some embodiments, generating the weighted sum signals may include decoding a single column address and simultaneously activating a plurality of column selection signals and generating a weighted sum signal using the column selection signals and a set of the 1-bit signals, wherein the number of the 1-bit signals in the set is the same as the number of the activated column selection signals.

According to some embodiments, the number of the 1-bit signals in the set maybe T, the number of the reference signals may be $2^T-1$, wherein T is a natural number greater than or equal to 2. According to some embodiments, the number of the 1-bit signals in the set may be T, the number of the levels may be $2^T$, wherein T is a natural number greater than or equal to 2. In some embodiments, the number of the levels maybe greater than the number of the reference signals.

Further embodiments of the inventive concept provide an image sensor including a plurality of 1-bit storage devices, respective ones of which are configured to store respective ones of a plurality of 1-bit signals, a signal generator configured to generate weighted sum signals having at least three different levels using the 1-bit signals stored in the 1-bit storage devices, and a comparator array configured to compare each of a plurality of reference signals with the weighted sum signals and to responsively generate a plurality of digital signals.

The image sensor may further include a plurality of pixels configured to generate respective pixel signals and a plurality of analog-to-digital converters configured to convert respective ones of the pixel signals into respective digital codes, wherein respective ones of the 1-bit signals are included in respective ones of the digital codes and the 1-bit signals are at the same bit positions in the digital codes. The image sensor may also include a column address decoder configured to decode a single column address and to simultaneously activate a plurality of column selection signals, wherein the signal generator generates the weighted sum signals using the column selection signals and the 1-bit signals.

In some embodiments, the image sensor may include a pixel configured to output a pixel signal and an analog-to-digital converter configured to convert the pixel signal into a digital code, wherein the 1-bit signals are included in the digital code and adjacent to each other in the digital code.

In further embodiments, the comparator array may include a plurality of comparators, respective ones of which are configured compare respective ones of the reference signals with the weighted sum signal and a decoder configured to decode comparison signals output from the comparators to generate the digital signals.

In still further embodiments, an image processing system includes an image sensor including a plurality of 1-bit storage devices configured to store respective ones of a plurality of 1-bit signals, a signal generator configured to generate weighted sum signals having at least 3 different levels using the 1-bit signals stored in the 1-bit storage devices, and a comparator array configured to compare respective ones of a plurality of reference signals with the weighted sum signals and to responsively generate a plurality of digital signals. The system further includes a processor configured to control the image sensor. The image sensor and the processor may be configured to communicate via a camera serial interface (CSI).

Additional embodiments of the inventive concept provide an image sensor including a pixel array configured to generate a plurality of pixel signals, an analog to digital converter circuit coupled to the pixel array and configured to generate respective digital codes responsive to respective ones of the pixel signals, a plurality of memories, respective ones of which are configured to store respective bits of the digital codes, a signal processing circuit coupled to a plurality of memories and configured to generate analog signals responsive to the stored bits, each of the analog signals corresponding to multiple ones of the stored bits, and a comparator circuit configured to compare the analog signals to respective ones of a plurality of reference signals to generate digital signals corresponding to the multiple ones of the stored bits. In some embodiments, each of the analog signals may correspond to multiple bits from two or more of the digital codes. In further embodiments, each of the analog signals may correspond to multiple bits from one of the digital codes.

According to some embodiments, the image sensor may further include an address decoder configured to select at least two of the memories responsive to a given address to provide multiple bits to the signal processing circuit, wherein the signal processing circuit is configured to generate one of the analog signals responsive to the provided multiple bits. In some embodiments, the address decoder may be configured to simultaneously select memories corresponding to at least two of the digital codes responsive to a given address to provide the multiple bits to the signal processing circuit from multiple ones of the digital codes. In further embodiments, the address decoder may be configured to simultaneously select memories corresponding to one of the digital codes responsive to a given address to provide the multiple bits to the signal processing circuit from the one of the digital codes.

Still further embodiments provide methods including storing respective digital codes corresponding respective ones of a plurality of pixel signals, generating analog signals responsive to bits at the store digital codes, each of the analog signals corresponding to multiple ones of the bits, and comparing the analog signals to respective ones of a plurality of reference signals to generate digital signals corresponding to the multiple ones of the bits.

BRIEF DESCRIPTION OF THE DRAWINGS

The above and other features and advantages of the inventive concept will become more apparent by describing in detail exemplary embodiments thereof with reference to the attached drawings in which:

FIG. 4 is a conceptual diagram of the operation of a signal generator illustrated in FIG. 2;

DETAILED DESCRIPTION

Figure 1:
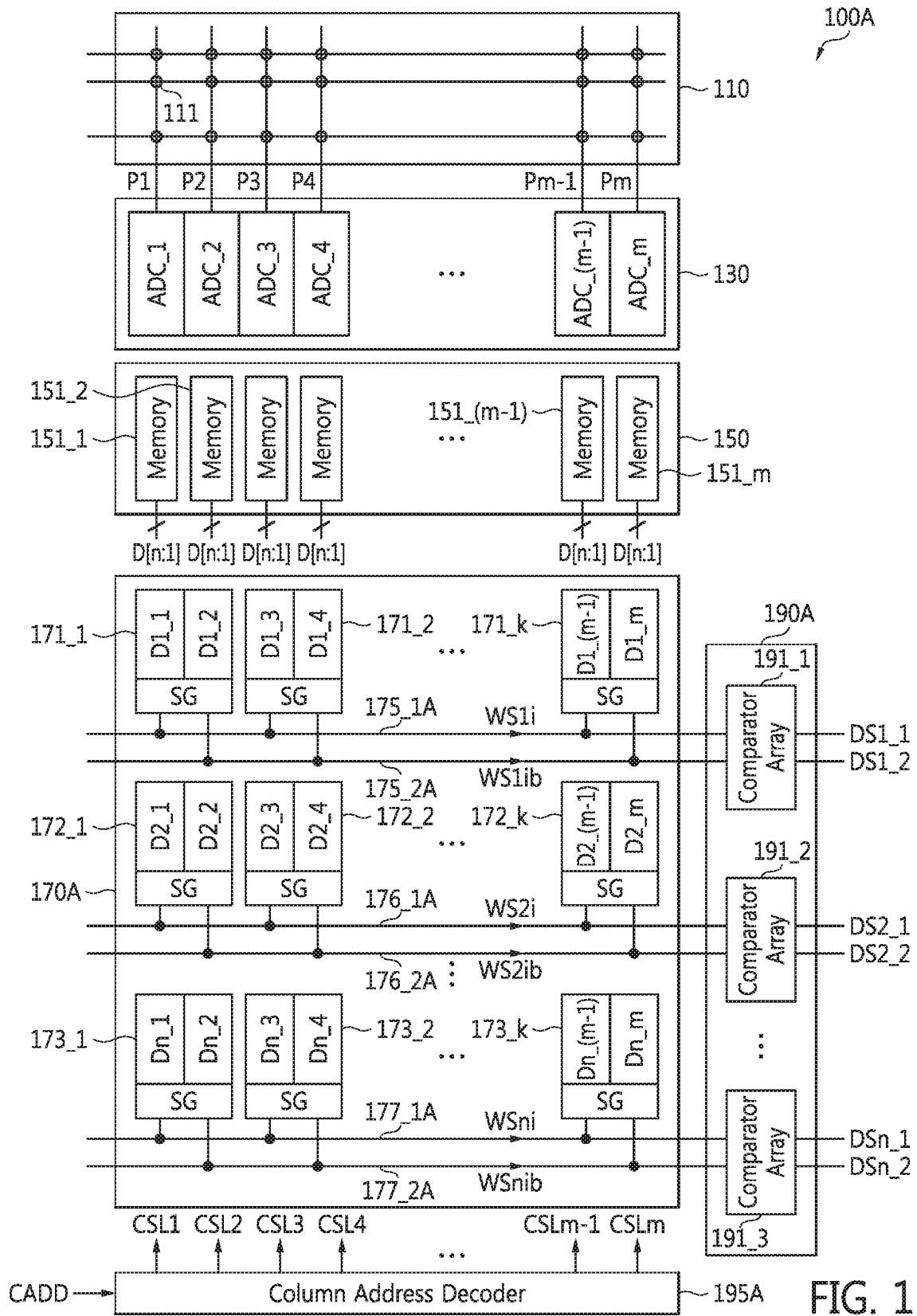
FIG. 1 is a block diagram of an image sensor according to some embodiments of the inventive concept.

The inventive concept now will be described more fully hereinafter with reference to the accompanying drawings, in which embodiments of the present disclosure are shown. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image sensor 100A according to some embodiments of the inventive concept. Referring to FIG. 1, the image sensor (or image sensor chip) 100A includes a pixel array 110, an analog-to-digital converter (ADC) block 130, a memory block 150, a signal processing block 170A, a comparator array block 190A, and a column address decoder 195A.

The pixel array 110 includes a plurality of pixels 111. Each of the pixels 111 includes a photoelectric conversion element and a pixel signal processing circuit that processes an output signal of the photoelectric conversion element. The photoelectric conversion element may be implemented as a photodiode, a phototransistor, a pinned photodiode, or a photogate. The photodiode may be implemented as an organic photodiode. The pixels 111 may output analog pixel signals P1 through Pm (where "m" is a natural number) to the ADC block 130 through respective column lines.

The ADC block 130 may perform analog-to-digital conversion on the analog pixel signals P1 through Pm. The ADC block 130 includes a plurality of ADCs ADC_1 through ADC_m which may respectively convert the analog pixel signals P1 through Pm into n-bit signals D[n:1]. Here, "n" is 2 or a natural number greater than 2. In other words, each of the ADCs ADC_1 through ADC_m may convert corresponding one of the analog pixel signals P1 through Pm into an n-bit digital code D[n:1].

The memory block 150 includes a plurality of memories 151_1 through 151_m. Each of the memories 151_1 through 151_m has a structure capable of storing the n-bit signal D[n:1] output from corresponding one of the ADCs ADC_1 through ADC_m. For example, each of the memories 151_1 through 151_m may include "n" 1-bit storage devices. A 1-bit storage device may be implemented, for example, as a static random access memory (SRAM), a latch, or a flip-flop.

The signal processing block 170A includes a plurality of signal generators 171_1 through 171_k, 172_1 through 172_k, . . . , and 173_1 through 173_k and a plurality of data buses 175_1A, 175_2A, 176_1A, 176_2A, . . . , 177_1A, and 177_2A. The signal generator 171_1 may generate weighted sum signals WS1i and WS1ib having one of at least three levels using a first bit signal D1_1 in the n-bit signal D[n:1] output from the first memory 151_1, a first bit signal D1_2 in the n-bit signal D[n:1] output from the second memory 151_2, and column selection signals CSL1 and CSL2; and may transmit the weighted sum signals WS1i and WS1ib to a comparator array 191_1 through a pair of the data buses 175_1A and 175_2A, respectively.

In other words, the signal generator 171_1 may generate the weighted sum signals WS1i and WS1ib using bit signals at the same positions (e.g., the first bit positions) in the n-bit signals D[n:1] respectively output from the memories 151_1 and 151_2.

The signal generator 172_1 may generate weighted sum signals WS2i and WS2ib having one of the at least three levels using a second bit signal D2_1 in the n-bit signal D[n:1] output from the first memory 151_1, a second bit signal D2_2 in the n-bit signal D[n:1] output from the second memory 151_2, and the column selection signals CSL1 and CSL2; and may transmit the weighted sum signals WS2i and WS2ib to a comparator array 191_2 through a pair of the data buses 176_1A and 176_2A, respectively.

In other words, the signal generator 172_1 may generate the weighted sum signals WS2i and WS2ib using bit signals at the same positions (e.g., the second bit positions) in the n-bit signals D[n:1] respectively output from the memories 151_1 and 151_2.

The signal generator 173_1 may generate weighted sum signals WSni and WSnib having one of the at least three levels using an $n^{th}$ bit signal Dn_1 in the n-bit signal D[n:1] output from the first memory 151_1, an $n^{th}$ bit signal Dn_2 in the n-bit signal D[n:1] output from the second memory 151_2, and the column selection signals CSL1 and CSL2; and may transmit the weighted sum signals WSni and WSnib to a comparator array 191_3 through a pair of the data buses 177_1A and 177_2A, respectively.

In other words, the signal generator 173_1 may generate the weighted sum signals WSni and WSnib using bit signals at the same positions (e.g., the $n^{th}$ bit positions) in the n-bit signals D[n:1] respectively output from the memories 151_1 and 151_2.

The weighted sum signals WS1i and WS1ib, WS2i and WS2ib, . . . , WSni and WSnib may be generated in parallel or simultaneously. The weighted sum signals WS1i through WSnib may be voltage or current.

The signal generator 171_k may generate weighted sum signals WS1i and WS1ib having one of the at least three levels using a first bit signal D1_(m−1) in the n-bit signal D[n:1] output from the $(m-1)^{th}$ memory 151_(m−1), a first bit signal D1_m in the n-bit signal D[n:1] output from the $m^{th}$ memory 151_m, and column selection signals CSLm−1 and CSLm; and may transmit the weighted sum signals WS1i and WS1ib to the comparator array 191_1 through the data buses 175_1A and 175_2A, respectively.

The signal generator 172_k may generate weighted sum signals WS2i and WS2ib having one of the at least three levels using a second bit signal D2_(m−1) in the n-bit signal D[n:1] output from the $(m-1)^{th}$ memory 151_(m−1), a second bit signal D2_m in the n-bit signal D[n:1] output from the $m^{th}$ memory 151_m, and the column selection signals CSLm−1 and CSLm; and may transmit the weighted sum signals WS2i and WS2ib to the comparator array 191_2 through the data buses 176_1A and 176_2A, respectively.

The signal generator 173_k may generate the weighted sum signals WSni and WSnib having one of the at least three levels using an $n^{th}$ bit signal Dn_(m−1) in the n-bit signal D[n:1] output from the $(m−1)^{th}$ memory 151_(m−1), an $n^{th}$ bit signal Dn_m in the n-bit signal D[n:1] output from the $m^{th}$ memory 151_m, and the column selection signals CSLm−1 and CSLm; and may transmit the weighted sum signals WSni and WSnib to the comparator array 191_3 through the data buses 177_1A and 177_2A, respectively.

For clarity of the description, FIG. 1 shows the embodiments in which weighted sum signals are generated using bit signals output from two respective memories and two column selection signals. However, an image sensor may have a structure in which weighted sum signals are generated using bit signals output from three memories and three column selection signals in other embodiments of the inventive concept.

The comparator array block 190A may compare a plurality of reference signals with weighted sum signals and generate a plurality of digital signals. The comparator array block 190A includes a plurality of the comparator arrays 191_1 through 191_3.

The comparator array 191_1 may generate two digital signals DS1_1 and DS1_2 corresponding to the two bit signals D1_1 and D1_2, D1_3 and D1_4, ..., or D1_(m−1) and D1_m using a plurality of reference signals and the weighted sum signals WS1i and WS1ib.

The comparator array 191_2 may generate two digital signals DS2_1 and DS2_2 corresponding to the two bit signals D2_1 and D2_2, D2_3 and D2_4, ..., or D2_(m−1) and D2_m using the reference signals and the weighted sum signals WS2i and WS2ib.

The comparator array 191_3 may generate two digital signals DSn_1 and DSn_2 corresponding to the two bit signals Dn_1 and Dn_2, Dn_3 and Dn_4, ..., or Dn_(m−1) and Dn_m using the reference signals and the weighted sum signals WSni and WSnib.

The column address decoder 195A may activate two column selection signals at a time in response to a given column address CADD input.

Figure 2:
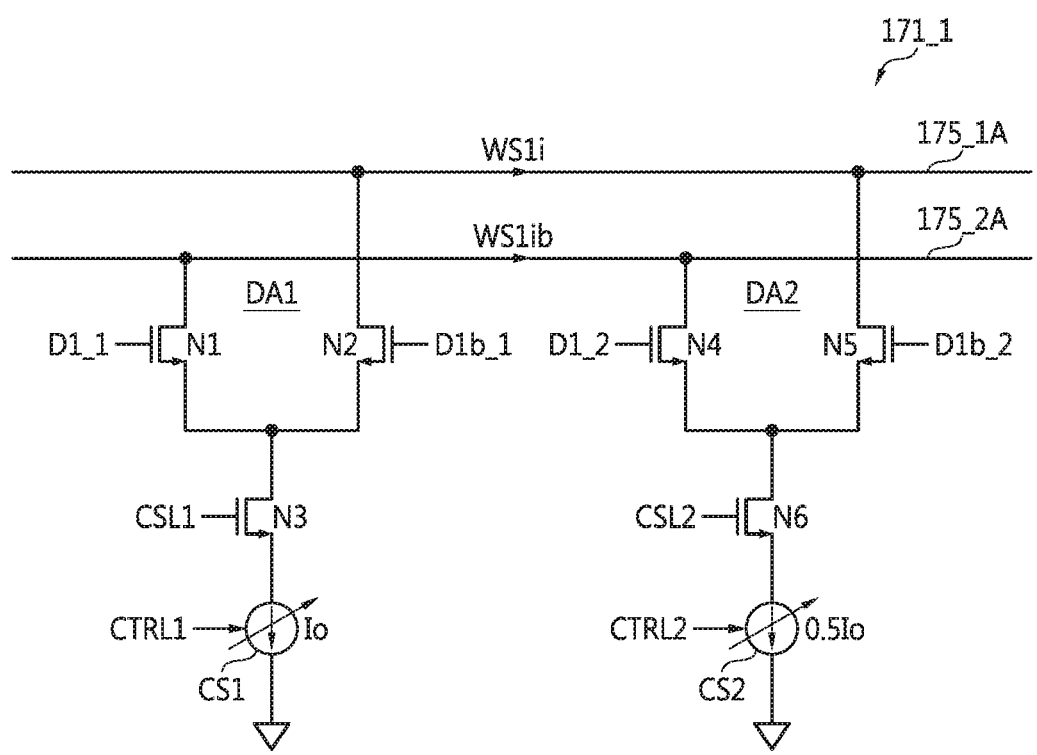
FIG. 2 is a circuit diagram of a signal generator illustrated in FIG. 1.
Figure 3:
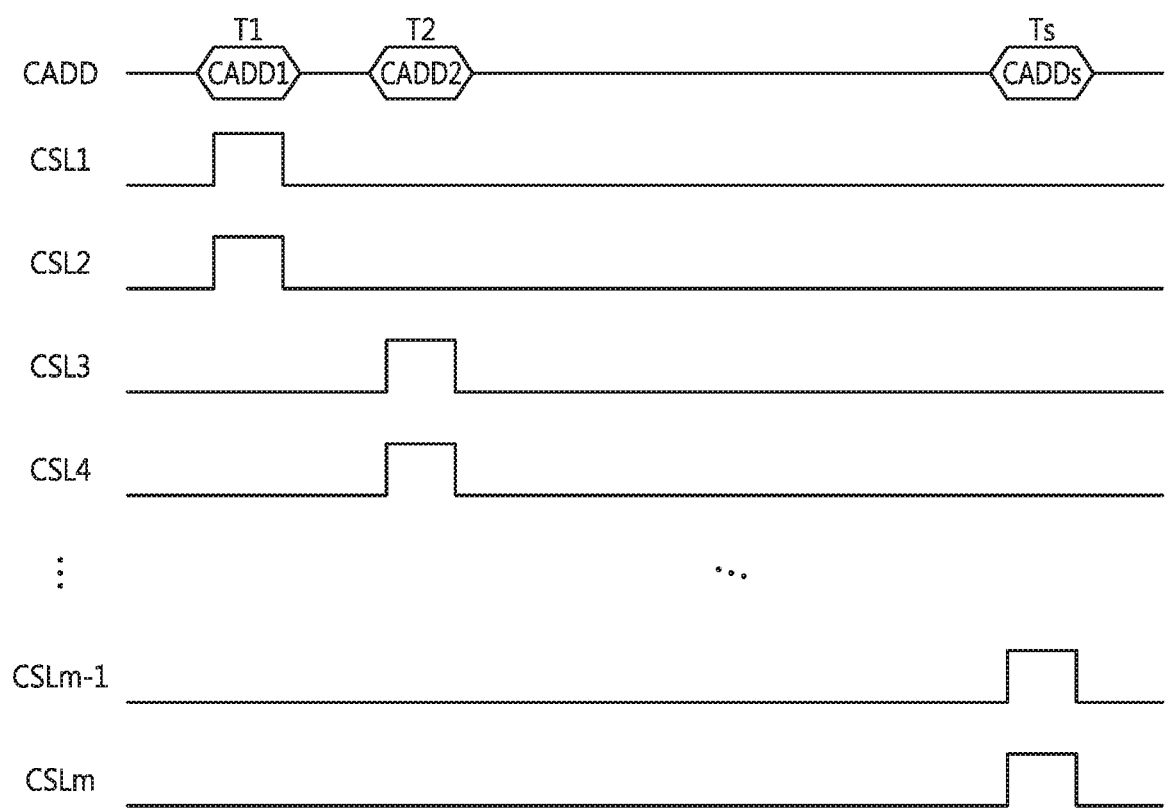
FIG. 3 is a diagram of the output waveforms of a column address decoder illustrated in FIG. 1 according to some embodiments of the inventive concept.

FIG. 2 is a circuit diagram of the signal generator 171_1 illustrated in FIG. 1. FIG. 3 is a diagram of the output waveforms of the column address decoder 195A illustrated in FIG. 1 according to some embodiments of the inventive concept. FIG. 4 is a conceptual diagram of the operation of the signal generator 171_1 illustrated in FIG. 2. The structure and the operations are substantially the same among the signal generators 171_1 through 171_k, 172_1 through 172_k, ..., and 173_1 through 173_k. Thus, for clarity of the description, the structure and the operations of the signal generator 171_1 are representatively described.

The signal generator 171_1 includes two differential amplifiers DA1 and DA2. The differential amplifiers DA1 and DA2 include control circuits CS1 and CS2, respectively, which control a swing level in response to control signals CTRL1 and CTRL2, respectively. For example, the control signals CTRL1 and CTRL2 may be generated from a timing generator (not shown) that controls the operations of the image sensor 100A. For example, the control circuits CS1 and CS2 may control bias current of the differential amplifiers DA1 and DA2, respectively.

As shown in FIG. 3, a pair of the column selection signals CSL1 and CSL2, CSL3 and CSL4, ..., or CSLm−1 and CSLm is simultaneously activated in response to a column address CADD1 input at a first point T1, a column address CADD2 input at a second point T2, or a column address CADDs input at an $s^{th}$ point Ts. Here, "s" is a natural number. For clarity of the description, it is assumed that a current of 1.5Io is supplied to the data buses 175_1A and 175_2A at each of points T1 through Ts.

As shown in FIG. 4, when the first bit signal D1_1 in the n-bit signal D[n:1] output from the first memory 151_1 is low or logic "0" and the first bit signal D1_2 in the n-bit signal D[n:1] output from the second memory 151_2 is low, a signal D1b_1 is high or logic "1" and a signal D1b_2 is high. NMOS transistors N2, N3, N5, and N6 are turned on in response to the signals D1b_1, CSL1, D1b_2, and CSL2, respectively, and NMOS transistors N1 and N4 are turned off in response to the signals D1_1 and D1_2, respectively. As a result, the weighted sum current WS1i flowing in the data bus 175_1A becomes 0 and the weighted sum current WS1ib flowing in the data bus 175_2A remains at 1.5Io.

When the first bit signal D1_1 in the n-bit signal D[n:1] output from the first memory 151_1 is low and the first bit signal D1_2 in the n-bit signal D[n:1] output from the second memory 151_2 is high, the signal D1b_1 is high and the signal D1b_2 is low. The NMOS transistors N2, N3, N4, and N6 are turned on in response to the signals D1b_1, CSL1, D1_2, and CSL2, respectively, and the NMOS transistors N1 and N5 are turned off in response to the signals D1_1 and D1b_2, respectively. As a result, the weighted sum current WS1i flowing in the data bus 175_1A becomes 0.5Io and the weighted sum current WS1ib flowing in the data bus 175_2A becomes 1.0Io.

When the first bit signal D1_1 in the n-bit signal D[n:1] output from the first memory 151_1 is high and the first bit signal D1_2 in the n-bit signal D[n:1] output from the second memory 151_2 is low, the signal D1b_1 is low and the signal D1b_2 is high. The NMOS transistors N1, N3, N5, and N6 are turned on in response to the signals D1_1, CSL1, D1b_2, and CSL2, respectively, and the NMOS transistors N2 and N4 are turned off in response to the signals D1b_1 and D1_2, respectively. As a result, the weighted sum current WS1i flowing in the data bus 175_1A becomes 1.0Io and the weighted sum current WS1ib flowing in the data bus 175_2A becomes 0.5Io.

When the first bit signal D1_1 in the n-bit signal D[n:1] output from the first memory 151_1 is high and the first bit signal D1_2 in the n-bit signal D[n:1] output from the second memory 151_2 is high, the signal D1b_1 is low and the signal D1b_2 is low. The NMOS transistors N1, N3, N4, and N6 are turned on in response to the signals D1_1, CSL1, D1_2, and CSL2, respectively, and the NMOS transistors N2 and N5 are turned off in response to the signals D1b_1 and D1b_2, respectively. As a result, the weighted sum current WS1i flowing in the data bus 175_1A becomes 1.5Io and the weighted sum current WS1ib flowing in the data bus 175_2A becomes 0.

In the embodiments illustrated in FIG. 4, the weighted sum currents WS1i and WS1ib may be set to one of four levels according to the level of the first bit signal D1_1 output from the first memory 151_1 and the level of the first bit signal D1_2 output from the second memory 151_2.

Figure 5:
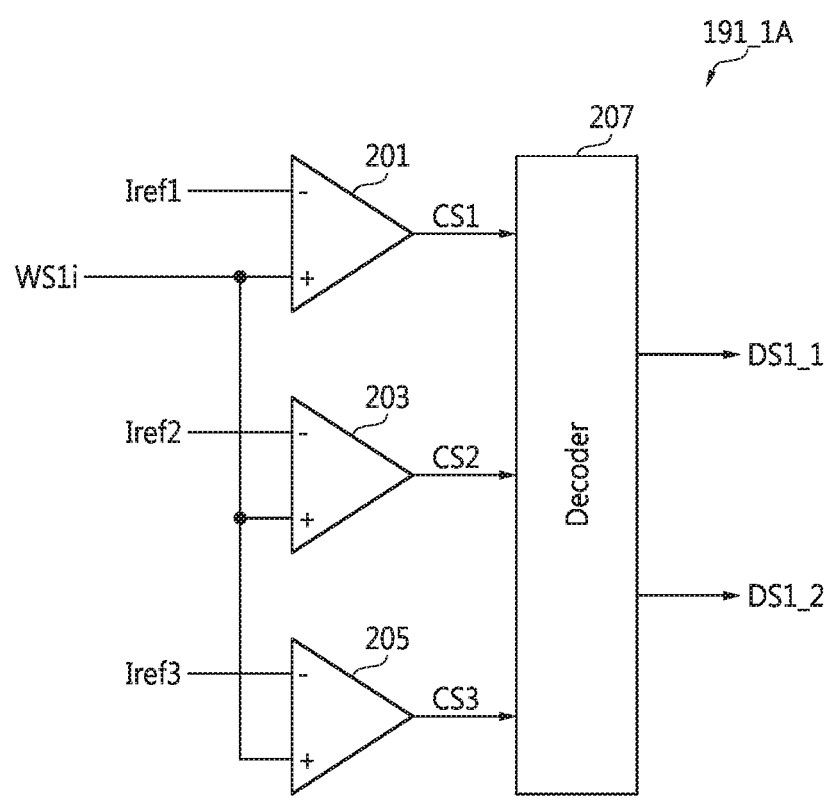
FIG. 5 is a block diagram of an example of a comparator array illustrated in FIG. 1.
Figure 6:
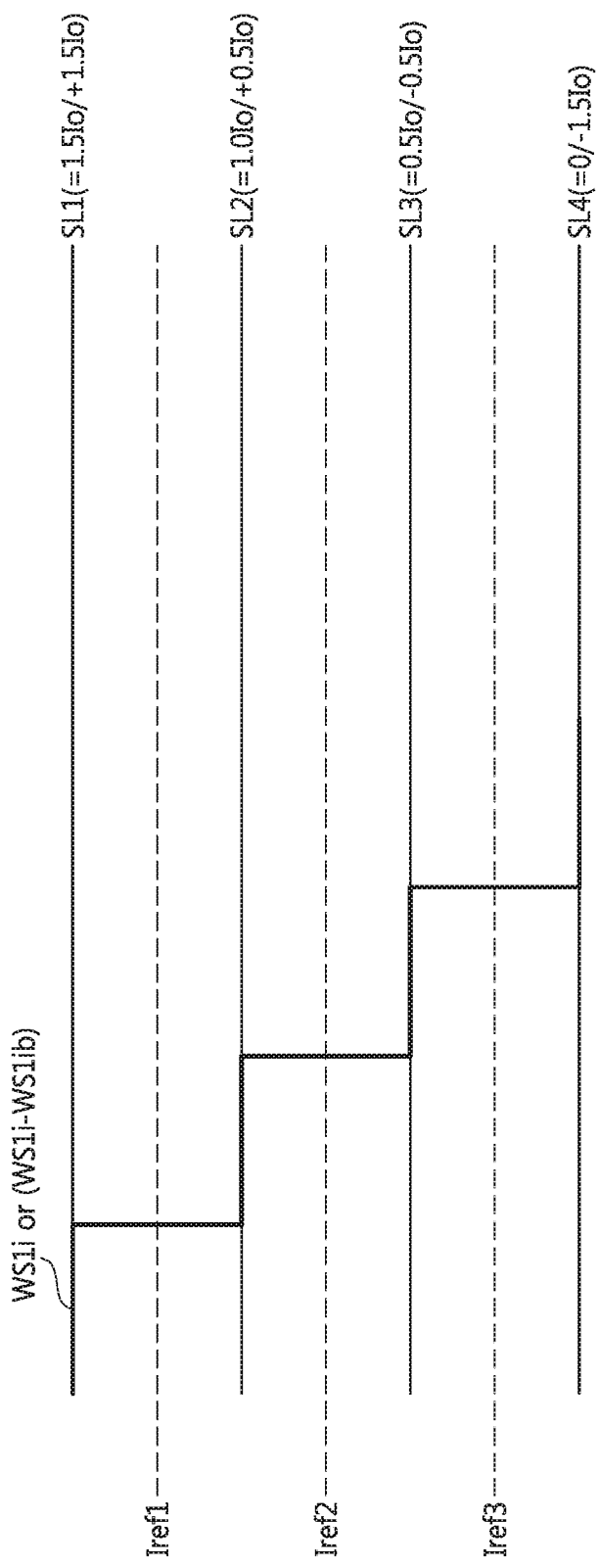
FIG. 6 is a diagram of signal waveforms for explaining the operation of the comparator array illustrated in FIG. 5.

FIG. 5 is a block diagram of an example of the comparator array 191-1 illustrated in FIG. 1. FIG. 6 is a diagram of signal waveforms for explaining the operation of the comparator array 191_1A illustrated in FIG. 5. The comparator arrays 191_1 through 191_3 substantially have the same structure and substantially perform the same operations. Thus, the structure and the operations of the comparator array 191-1 will be representatively described. The example of the comparator array 191-1, i.e. a comparator array 191_1A includes a plurality of comparators 201, 203, and 205 and a decoder 207. Each of the comparators 201, 203, and 205 may be implemented as a voltage comparator or a current comparator.

The comparator 201 compares the weighted sum signal WS1$i$ with a first reference signal Iref1 and outputs a first comparison signal CS1. The comparator 203 compares the weighted sum signal WS1$i$ with a second reference signal Iref2 and outputs a second comparison signal CS2. The comparator 205 compares the weighted sum signal WS1$i$ with a third reference signal Iref3 and outputs a third comparison signal CS3.

Referring to FIG. 6, when the weighted sum signal WS1$i$ is at a first level SL1 (=1.5Io), the comparison signals CS1, CS2, and CS3 are at a high level.

When the weighted sum signal WS1$i$ is at a second level SL2 (=1.0Io), the first comparison signal CS1 is at a low level and the other comparison signals CS2 and CS3 are at the high level.

When the weighted sum signal WS1$i$ is at a third level SL3 (=0.5Io), the first and second comparison signals CS1 and CS2 are at the low level and the third comparison signal CS is at the high level.

When the weighted sum signal WS1$i$ is at a fourth level SL4 (=0), the comparison signals CS1, CS2, and CS3 are at the low level.

The decoder 207 may decode the level of each of the comparison signals CS1, CS2, and CS3 and output the digital signals DS1_1 and DS1_2 respectively corresponding to two bit signals D1_1 and D1_2 according to the decoding result.

For example, when the comparison signals CS2 and CS3 are at the high level, the decoder 207 may generate two bit signals D1_1 and D1_2 at a high level. When the comparison signals CS2 and CS3 are at the low level, the decoder 207 may generate two bit signals D1_1 and D1_2 at a low level.

Figure 7:
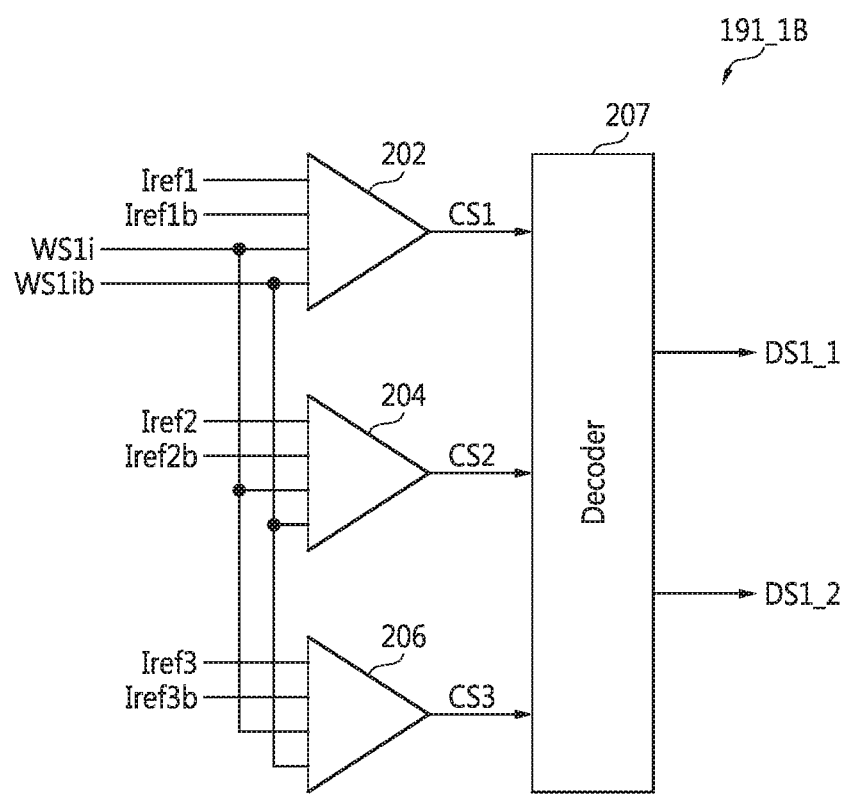
FIG. 7 is a block diagram of another example of the comparator array illustrated in FIG. 1.

FIG. 7 is a block diagram of another example of the comparator array 191_1 illustrated in FIG. 1. The comparator arrays 191_1 through 191_3 substantially have the same structure and substantially perform the same operations. Thus, the structure and the operations of the comparator array 191-1 will be representatively described. The example of the comparator array 191-1, i.e. a comparator array 191_1B includes a plurality of comparators 202, 204, and 206 and the decoder 207. Each of the comparators 202, 204, and 206 may be implemented as a voltage comparator or a current comparator.

The comparator 202 may compare a difference (e.g., WS1$i$-WS1$ib$) between the weighted sum signals WS1$i$ and WS1$ib$ with a difference between first reference signals Iref1 and Iref1$b$ and output a first comparison signal CS1. The first reference signals Iref1 and Iref1$b$ may be differential signals.

The comparator 204 may compare the difference between the weighted sum signals WS1$i$ and WS1$ib$ with a difference between second reference signals Iref2 and Iref2$b$ and output a second comparison signal CS2. The second reference signals Iref2 and Iref2$b$ may be differential signals.

The comparator 206 may compare the difference between the weighted sum signals WS1$i$ and WS1$ib$ with a difference between third reference signals Iref3 and Iref3$b$ and output a third comparison signal CS3. The third reference signals Iref3 and Iref3$b$ may be differential signals.

When the difference (e.g., WS1$i$-WS1$ib$) between the weighted sum signals WS1$i$ and WS1$ib$ is at the first level SL1 (=+1.5Io) as shown in FIG. 6, the comparison signals CS1, CS2, and CS3 are at the high level.

When the difference (e.g., WS1$i$-WS1$ib$) between the weighted sum signals WS1$i$ and WS1$ib$ is at the second level SL2 (=+0.5Io), the first comparison signal CS1 is at the low level and the other comparison signals CS2 and CS3 are at the high level.

When the difference (e.g., WS1$i$-WS1$ib$) between the weighted sum signals WS1$i$ and WS1$ib$ is at the third level SL3 (=−0.5Io), the comparison signals CS1 and CS2 are at the low level and the third comparison signal CS3 is at the high level.

When the difference (e.g., WS1$i$-WS1$ib$) between the weighted sum signals WS1$i$ and WS1$ib$ is at the fourth level SL4 (=−1.5Io), the comparison signals CS1, CS2, and CS3 are at the low level.

The decoder 207 may decode the level of each of the comparison signals CS1, CS2, and CS3 and output the digital signals DS1_1 and DS1_2 respectively corresponding to two bit signals D1_1 and D1_2 according to the decoding result.

For example, when the comparison signals CS2 and CS3 are at the high level, the decoder 207 may generate two bit signals D1_1 and D1_2 at the high level. When the comparison signals CS2 and CS3 are at the low level, the decoder 207 may generate two bit signals D1_1 and D1_2 at the low level.

As has been described with reference to FIGS. 1 through 7, when at least one weighted sum signal is generated using a 1-bit signal output from each of T memories (where T is 2 or a natural number greater than 2) among the memories 151_1 through 151_$m$, the weighted sum signal may be set to one of $2^T$ levels and each comparator array may include ($2^T$−1) comparators.

Figure 8:
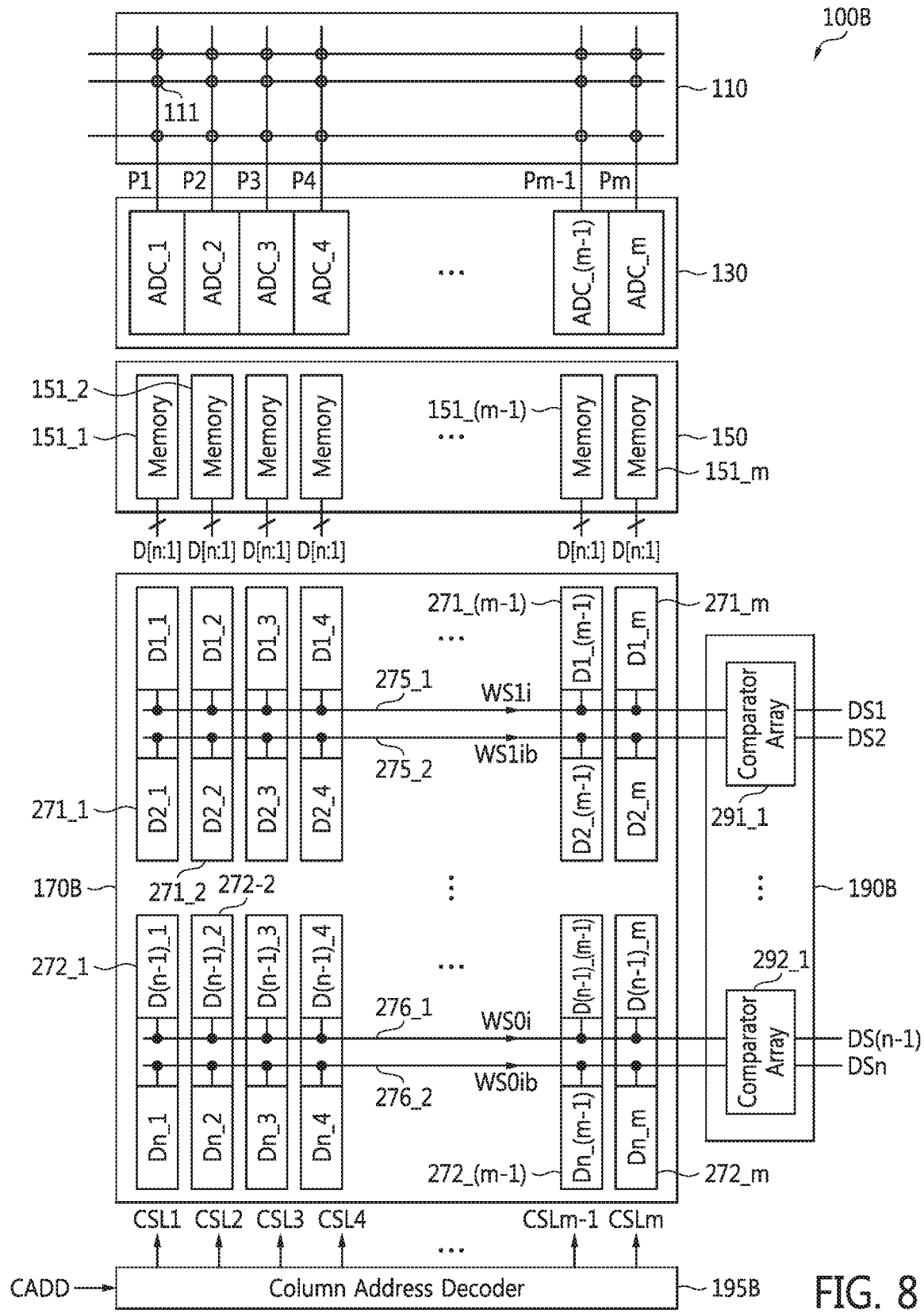
FIG. 8 is a block diagram of an image sensor according to other embodiments of the inventive concept.

FIG. 8 is a block diagram of an image sensor 100B according to further embodiments of the inventive concept. Referring to FIG. 8, the image sensor 100B includes a pixel array 110, an ADC block 130, a memory block 150, a signal processing block 170B, a comparator array block 190B, and a column address decoder 195B.

The signal processing block 170B includes a plurality of signal generators 271_1 through 271_$m$, . . . , and 272_1 through 272_$m$ and a plurality of data buses 275_1 and 275_2, . . . , and 276_1 and 276_2.

The signal generator 271_1 may generate weighted sum signals WS1$i$ and WS1$ib$ having one of at least three levels using the first and second bit signals D1_1 and D2_1 output from the first memory 151_1 and the column selection signals CSL1 and CSL2 and may transmit the weighted sum signals WS1$i$ and WS1$ib$ to a comparator array 291_1 through a pair of the data buses 275_1 and 275_2, respectively.

The signal generator 272_1 may generate weighted sum signals WS0$i$ and WS0$ib$ having one of the at least three levels using (n−1)$^{th}$ and n$^{th}$ bit signals D(n−1)_1 and Dn_1 output from the first memory 151_1 and the column selection signals CSL1 and CSL2 and may transmit the weighted sum signals WS0$i$ and WS0$ib$ to a comparator array 292_1 through a pair of the data buses 276_1 and 276_2, respectively.

The signal generator 271_$m$ may generate the weighted sum signals WS1$i$ and WS1$ib$ having one of the at least three levels using the first and second bit signals D1_$m$ and D2_$m$ output from the m$^{th}$ memory 151_$m$ and the column selection signals CSLm−1 and CSLm and may transmit the weighted sum signals WS1$i$ and WS1$ib$ to the comparator array 291_1 through the data buses 275_1 and 275_2, respectively.

The signal generator 272_$m$ may generate the weighted sum signals WS0$i$ and WS0$ib$ having one of the at least three levels using (n-1)$^{th}$ and n$^{th}$ bit signals D(n-1)_m and Dn_m output from the m$^{th}$ memory 151_$m$ and the column selection signals CSLm-1 and CSLm and may transmit the weighted sum signals WS0$i$ and WS0$ib$ to the comparator array 292_1 through the data buses 276_1 and 276_2, respectively.

The structure and the operations of the comparator arrays 291_1 through 292_1 are substantially the same as those of the comparator array 191_1A illustrated in FIG. 5 or the comparator array 191_1B illustrated in FIG. 7.

As described above, each of the signal generators 271_1 through 271_$m$, . . . , or 272_1 through 272_$m$ may generate weighted sum signals having one of $2^T$ levels (where T is 2 or a natural number greater than 2) using T 1-bit signals output from corresponding one of the memories 251_1 through 251_$m$.

The comparator array block 190B may compare a plurality of reference signals with weighted sum signals and generate a plurality of digital signals. The comparator array block 190B includes a plurality of the comparator arrays 291_1 through 292_1.

The comparator array 291_1 may generate two digital signals DS1 and DS2 corresponding to the two bit signals D1_1 and D2_1, D1_2 and D2_2, . . . , or D1_m and D2_m output from corresponding one of the memories 251_1 through 251_$m$ using a plurality of reference signals and the weighted sum signals WS1$i$ and WS1$ib$.

The comparator array 292_1 may generate two digital signals DS(n-1) and DSn corresponding to the two bit signals D(n-1)_1 and Dn_1, D(n-1)_2 and Dn_2, . . . , or D(n-1)_m and Dn_m output from corresponding one of the memories 251_1 through 251_$m$ using a plurality of reference signals and the weighted sum signals WS0$i$ and WS0$ib$.

The column address decoder 195B may activate two column selection signals at a time in response to a given column address CADD input.

Figure 9:
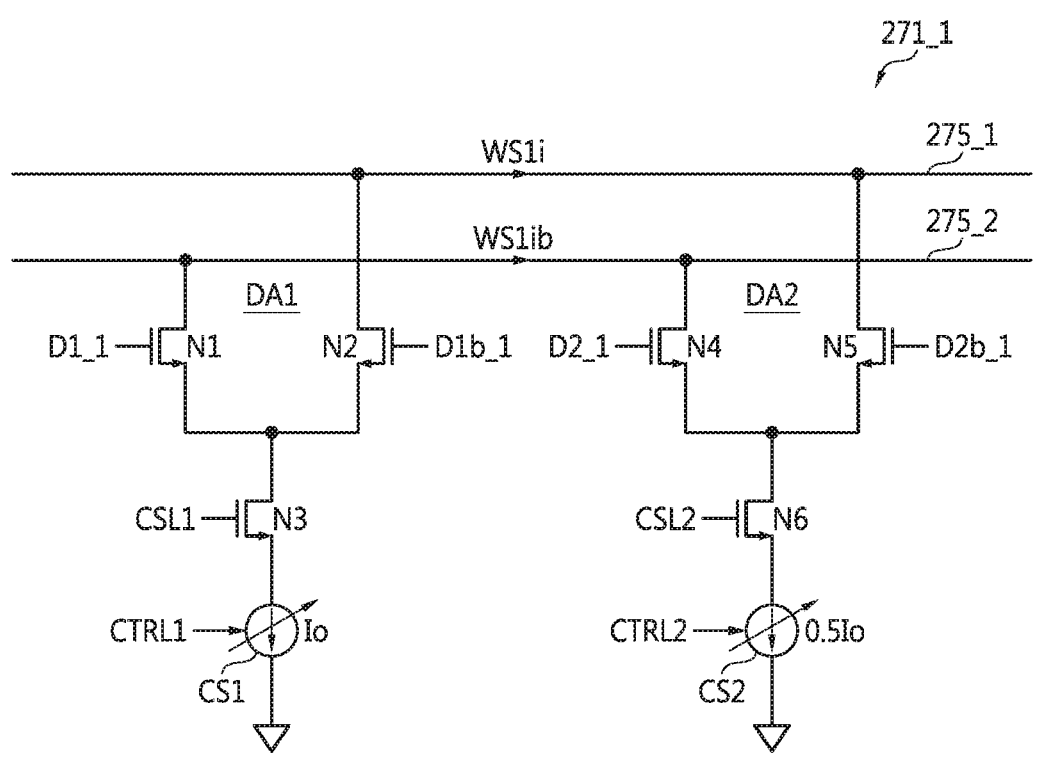
FIG. 9 is a circuit diagram of a signal generator illustrated in FIG. 8.

FIG. 9 is a circuit diagram of the signal generator 271_1 illustrated in FIG. 8. The structure and the operations are substantially the same among the signal generators 271_1 through 271_$m$, . . . , and 272_1 through 272_$m$. Thus, the structure and the operations of the signal generator 271_1 will be representatively described for clarity of the description.

The signal generator 271_1 includes two differential amplifiers DA1 and DA2. Except for some input signals D2_1 and D2$b$_1, the structure and the operations of the signal generator 271_1 illustrated in FIG. 9 are substantially the same as those of the signal generator 171_1 illustrated in FIG. 2.

Figure 10:
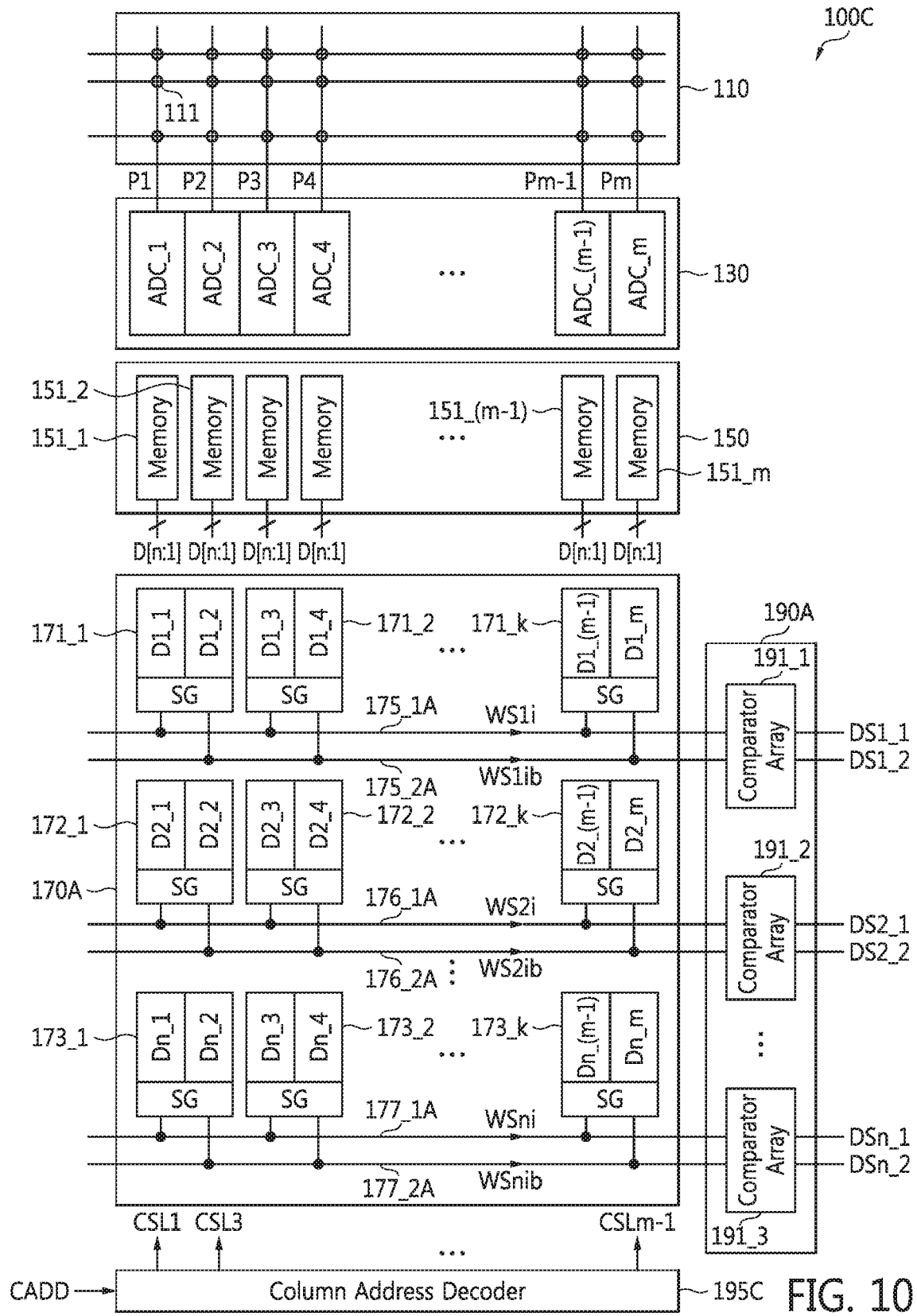
FIG. 10 is a block diagram of an image sensor according to still other embodiments of the inventive concept.

FIG. 10 is a block diagram of an image sensor 100C according to additional embodiments of the inventive concept. FIG. 12 is a diagram of the output waveforms of a column address decoder 195C illustrated in FIG. 11 according to some embodiments of the inventive concept. Except for the column address decoder 195C, the structure and the operations of the image sensor 100C illustrated in FIG. 10 are substantially the same as those of the image sensor 100A illustrated in FIG. 1.

In detail, the column address decoder 195C sequentially activate the odd-numbered column selection signals CSL1, CSL3, . . . , CSLm-1 in response to the column addresses CADD1 through CADDs, respectively, input at the respective points T1 through Ts, as shown in FIG. 12.

Figure 11:
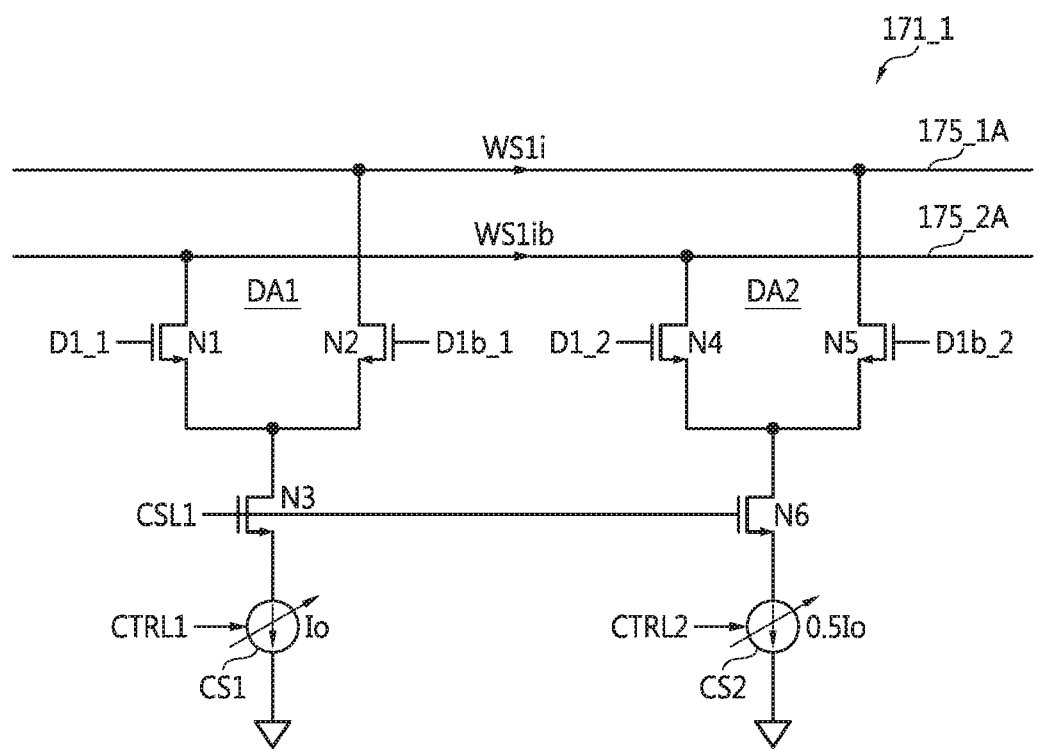
FIG. 11 is a circuit diagram of a signal generator illustrated in FIG. 10.
Figure 12:
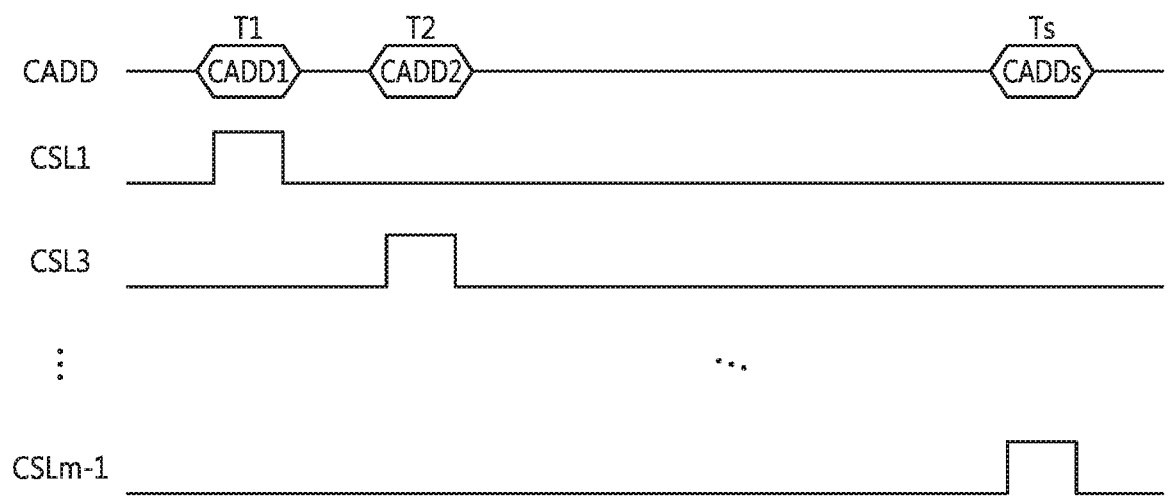
FIG. 12 is a diagram of the output waveforms of a column address decoder illustrated in FIG. 11 according to some embodiments of the inventive concept.

FIG. 11 is a circuit diagram of the signal generator 171_1 illustrated in FIG. 10. The structure and the operations of the signal generator 171_1 illustrated in FIG. 11 are substantially the same as those of the signal generator 171_1 illustrated in FIG. 2 with the exception that both of the transistors N3 and N6 operate in response to a single column selection signal CSL1.

Figure 13:
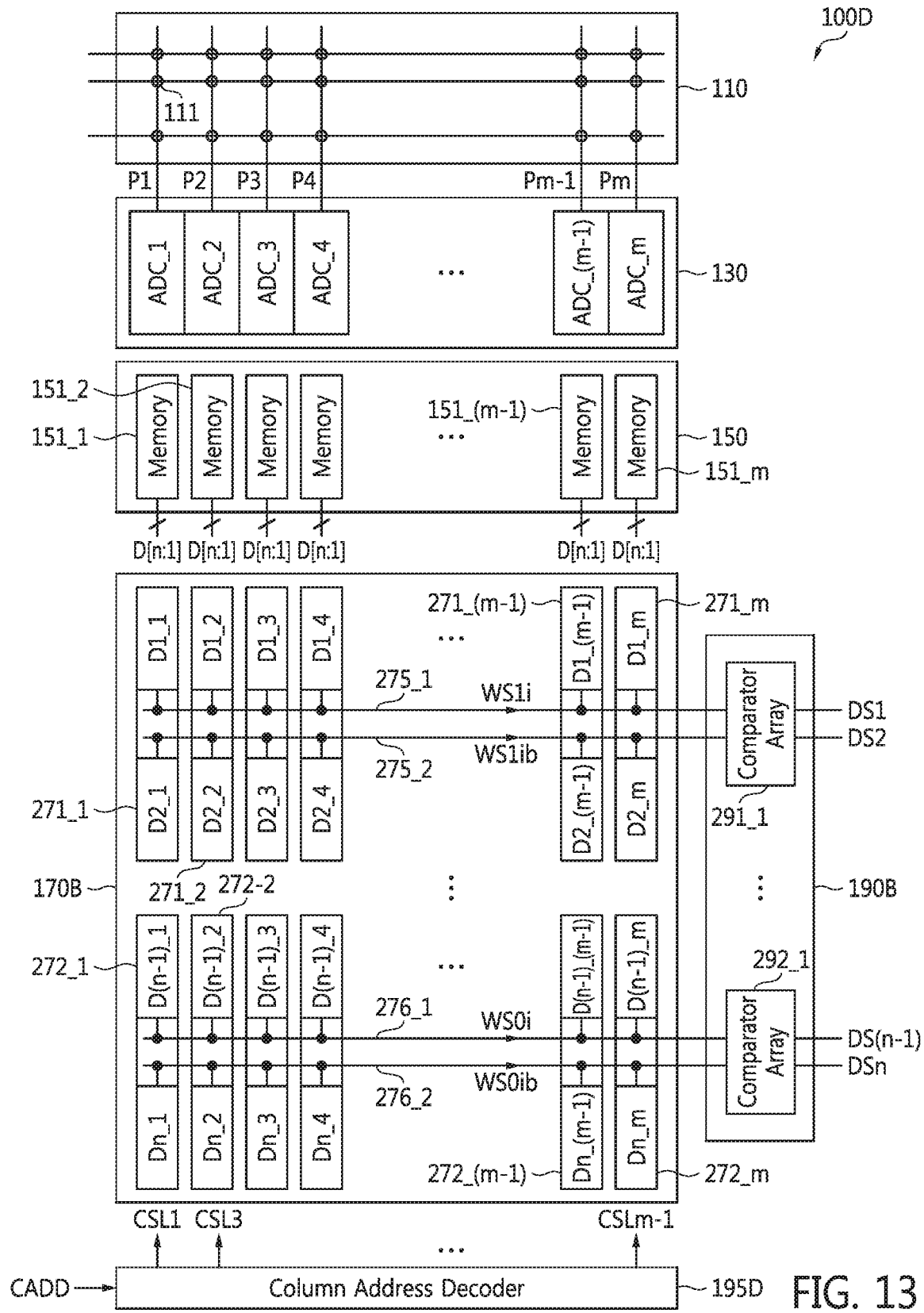
FIG. 13 is a block diagram of an image sensor according to yet other embodiments of the inventive concept.

FIG. 13 is a block diagram of an image sensor 100D according to yet further embodiments of the inventive concept. Except for a column address decoder 195D, the structure and the operations of the image sensor 100D illustrated in FIG. 13 are substantially the same as those of the image sensor 100B illustrated in FIG. 8.

Figure 14:
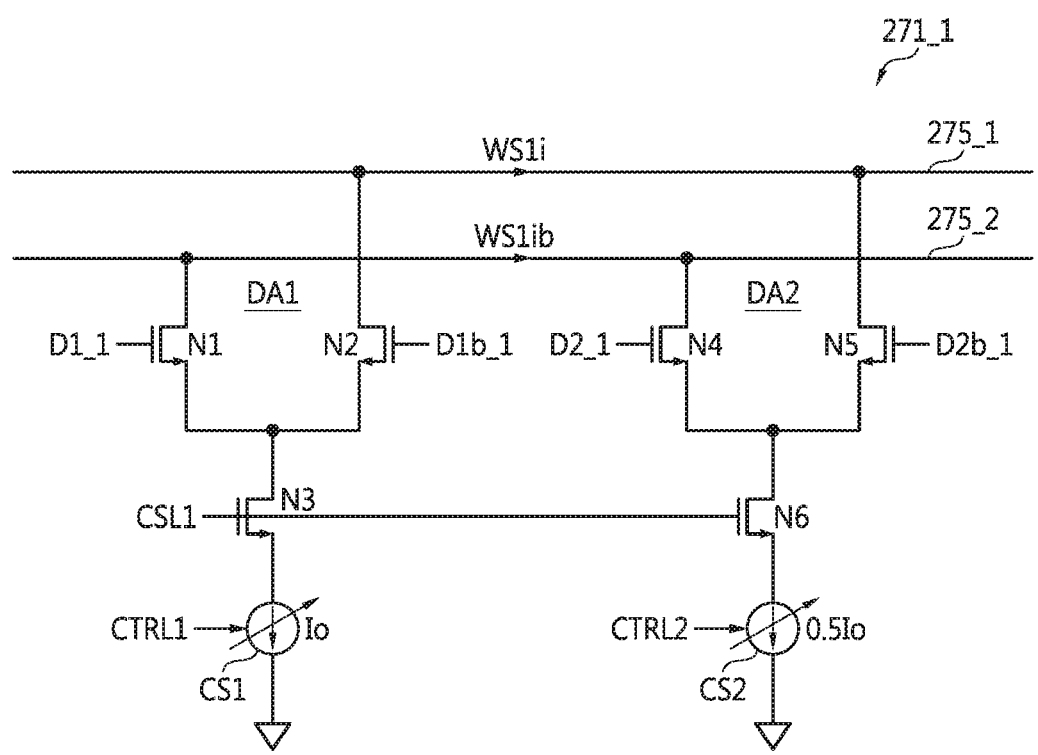
FIG. 14 is a circuit diagram of a signal generator illustrated in FIG. 13.

FIG. 14 is a circuit diagram of the signal generator 271_1 illustrated in FIG. 13. The structure and the operations of the signal generator 271_1 illustrated in FIG. 14 are substantially the same as those of the signal generator 271_1 illustrated in FIG. 9 with the exception that both of the transistors N3 and N6 operate in response to a single column selection signal CSL1.

Figure 15:
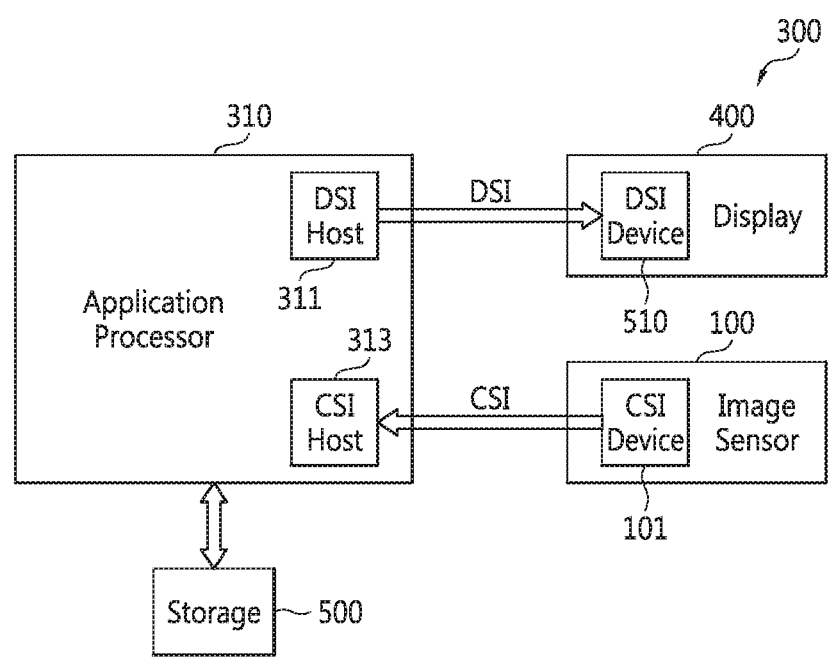
FIG. 15 is a block diagram of an image processing system according to some embodiments of the inventive concept.

FIG. 15 is a block diagram of an image processing system 300 according to some embodiments of the inventive concept. Referring to FIGS. 1 through 15, the image processing system 300 includes the image sensor 100A, 100B, 100C, or 100D (collectively denoted by 100), a processor 310, a display 400, and storage 500.

The image processing system 300 may be implemented as a portable electronic device or mobile computing device. The portable electronic device may be a laptop computer, a cellular phone, a smartphone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book.

The image sensor 100 may be implemented as a CMOS image sensor chip. The processor 310 may control the operations of the elements 100, 400, and 500. The processor 310 may be implemented as an integrated circuit (IC), a system on chip (SoC), an application processor (AP), or a mobile AP.

The image sensor 100 may transmit image data to the processor 310 through serial interface, e.g., mobile industry processor interface (MIPI®) camera serial interface (CSI). A CSI host 313 included in the processor 310 may perform serial communication with a CSI device 101 included in the image sensor 100 using the CSI.

The processor 310 may transmit image data to the display 400 using MIPI® display serial interface (DSI). A DSI host 311 included in the processor 310 may perform serial communication with a DSI device 101 included in the display 400 using the DSI. The processor 310 may store image data in the storage 500 and may read image data from the storage 500.

Figure 16:
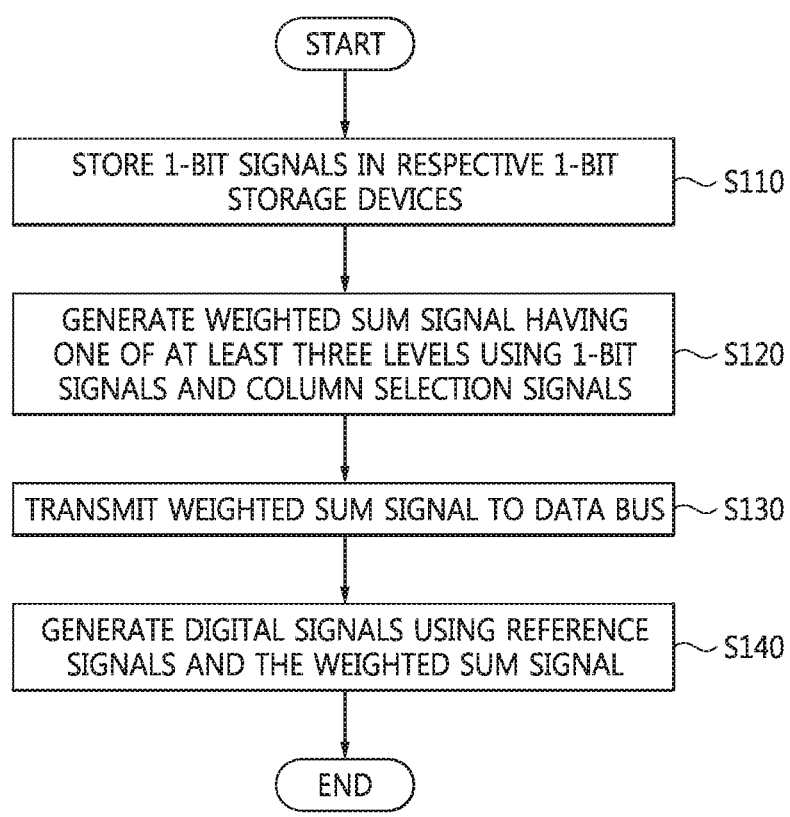
FIG. 16 is a flowchart of a method of operating an image sensor according to some embodiments of the inventive concept.

FIG. 16 is a flowchart of a method of operating an image sensor according to some embodiments of the inventive concept. Referring to FIGS. 1 through 16, an n-bit digital code output from each of the ADCs ADC_1 through ADC_m may be stored in one of the memories 151_1 through 151_$m$. For example, 1-bit signals in the n-bit digital code may be stored in respective 1-bit storage devices in each of the memories 151_1 through 151_$m$ in operation S110.

A signal generator may generate a weighted sum signal(s) having one of at least three levels using 1-bit signals stored in respective 1-bit storage devices in operation S120. The signal generator may transmit the weighted sum signal(s) to a data bus in operation S130. A comparator block may compare each of a plurality of reference signals with the weighted sum signal and generate a plurality of digital signals in operation S140.

As described above with reference to FIGS. 1 and 10, each of the 1-bit signals may be generated based on pixel signals respectively output from different pixels. Each of the ADCs ADC_1 through ADC_m may convert one of the pixel signals P1 through Pm output by columns of the pixels 111 into the digital code D[n:1]. The 1-bit signals are bit signals at the same positions in digital codes respectively corresponding to different pixels.

In some embodiments, as described above with reference to FIGS. 8 and 13, the 1-bit signals may be generated based on a pixel signal output from one pixel. The 1-bit signals may be included in a digital code corresponding to the pixel signal and may be adjacent to each other in the digital code.

The image sensor 100 may adjust a plurality of weighted sum coefficients for each of the control circuits CS1 and CS2 included in the signal generator 171_1 or 271_1 according to the control of the processor 310. The weighted sum coefficients for each of the control circuits CS1 and CS2 may be adjusted or determined based on the control signal CTRL1 or CTRL2. The signal generator 171_1 or 271_1 may generate a weighted sum signal using the adjustment result and the 1-bit signals.

Figure 17:
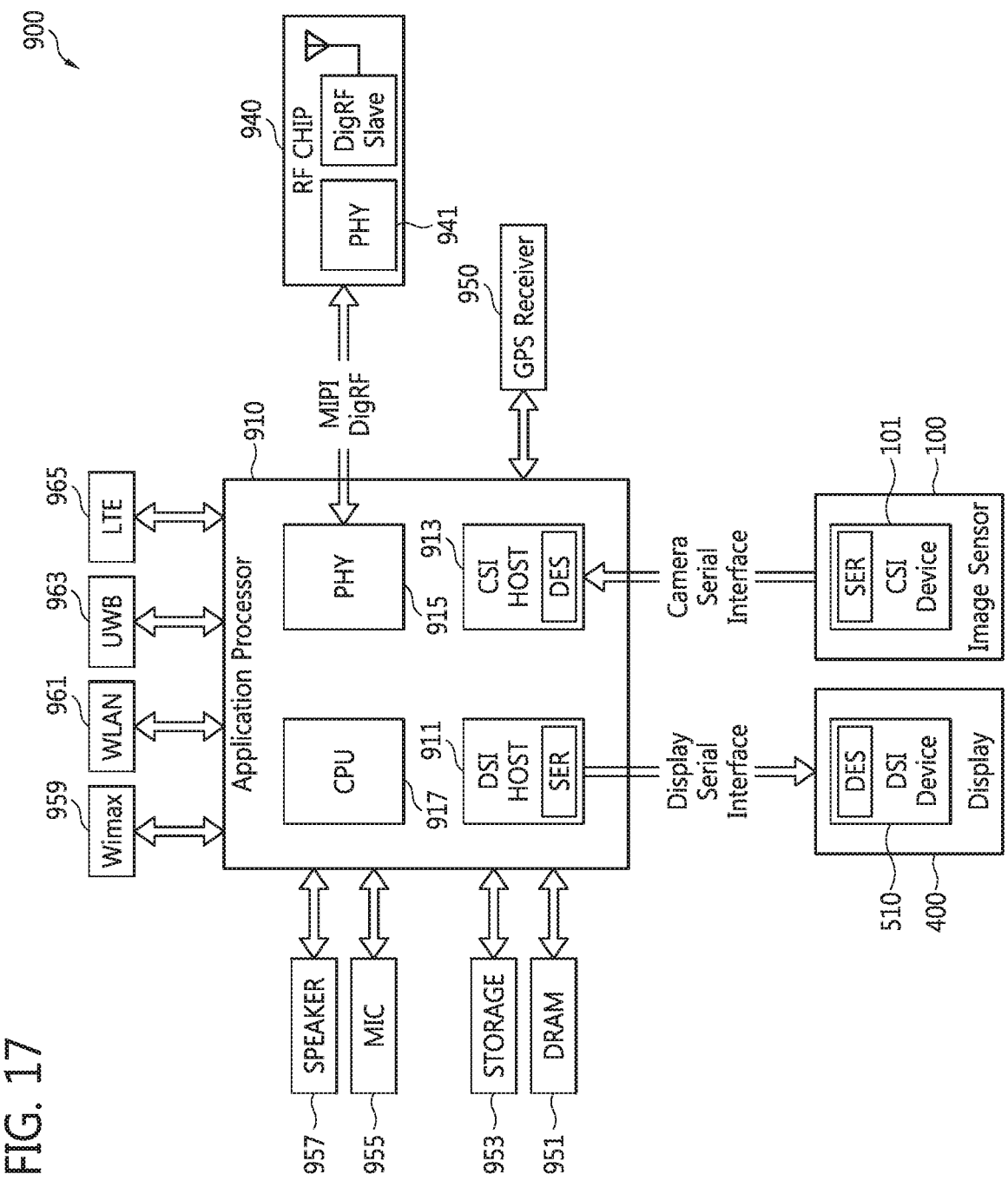
FIG. 17 is a block diagram of an image processing system according to other embodiments of the inventive concept.

FIG. 17 is a block diagram of an image processing system 900 according to further embodiments of the inventive concept. Referring to FIGS. 1 through 17, the image processing system 900 may be implemented as a portable electronic device which can use or support MIPI. The image processing system 900 includes an AP 910, the CMOS image sensor 100, and the display 400.

A CSI host 913 in the AP 910 may perform serial communication with the CSI device 101 in the CMOS image sensor 100 through CSI. A deserializer DES and a serializer SER may be implemented in the CSI host 913 and the CSI device 101, respectively. The CMOS image sensor 100 may be one of the CMOS image sensors 100A through 100D described with reference to FIGS. 1 through 14.

A DSI host 911 in the AP 910 may perform serial communication with the DSI device 510 in the display 400 through DSI. A serializer SER and a deserializer DES may be implemented in the DSI host 911 and the DSI device 510, respectively. The serializers SER and the deserializers DES may process electrical signals or optical signals.

The image processing system 900 may also include a radio frequency (RF) chip 940 communicating with the AP 910. A physical layer (PHY) 915 of the AP 910 and a PHY 941 of the RF chip 940 may communicate data with each other according to MIPI DigRF.

A central processing unit (CPU) 917 included in the AP 910 may control the operations of the CMOS image sensor 100 and the display 400. The CPU 917 may also control the operations of the DSI host 911, the CSI host 913, and the PHY 915.

The image processing system 900 may further include a global positioning system (GPS) receiver 950, a memory 951 such as dynamic random access memory (DRAM), a data storage 953 implemented as a non-volatile memory such as NAND flash memory, a microphone (MIC) 955, and/or a speaker 957. The image processing system 900 may communicate with external devices using at least one communication protocol or standard, e.g., worldwide interoperability for microwave access (Wimax) 959, wireless local area network (WLAN) 961, ultra-wideband (UWB) 963, or long term evolution (LTE™) 965. The image processing system 900 may communicate with external devices using Bluetooth, near field communication (NFC), or WiFi.

As described above, according to some embodiments of the inventive concept, an image sensor may increase transfer efficiency of data transmitted through a data bus and decrease a silicon area necessary to form the data bus. As a result, the entire die size for the image sensor may be decreased. Instead of transmitting each of sequential bits through a data bus, the image sensor may transmit a single weighted sum signal corresponding to at least two bits through a data bus, thereby increasing data transfer efficiency of the data bus.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. An image sensor comprising:
a memory configured to store first digital signals generated based on pixel signals;
a signal generator configured to generate a first weighted sum signal and a second weighted sum signal responsive to N number of 1-bit signal among the first digital signals; and
a comparator configured to generate a second digital signal in response to the first weighted sum signal,
wherein the first weighted sum signal has one of levels of more than N different levels,
wherein N is a natural number,
wherein the signal generator is further configured to:
receive the N number of 1-bit signal among the first digital signals from the memory,
compare a first 1-bit signal received from a first address in the memory with a second first 1-bit signal received from a second address in the memory, and
generate the first weighted sum signal based on a result of the comparison between the first 1-bit signal and the second 1-bit signal.

2. The image sensor of claim 1, the second weighted sum signal has one of the levels more than N different levels.

3. The image sensor of claim 1, wherein each of the first and the second weighted sum signals has one of (N+1) different levels.

4. The image sensor of claim 1, wherein the N is 2, and the N number of 1-bit signal includes a first 1-bit signal and a second 1-bit signal.

5. The image sensor of claim 4, wherein the comparator is configured to generate the second digital signal corresponding to the first 1-bit signal and a third digital signal corresponding to the second 1-bit signal in response to the first weighted sum signal.

6. The image sensor of claim 4, wherein the comparator is configured to generate the second digital signal corresponding to the first 1-bit signal and a third digital signal corresponding to the second 1-bit signal in response to a difference between the first weighted sum signal and the second weighted sum signal.

7. The image sensor of claim 4, wherein the comparator is configured to generate the second digital signal corresponding to the first 1-bit signal and a third digital signal corresponding to the second 1-bit signal by comparing the first weighted sum signal to each of a plurality of reference signals.

8. The image sensor of claim 4, wherein the comparator is configured to generate the second digital signal corresponding to the first 1-bit signal and a third digital signal corresponding to the second 1-bit signal by comparing a difference between the first weighted sum signal and the second weighted sum signal to each of a plurality of reference signals.

9. An image sensor comprising:
  a pixel array;
  an analog-to-digital converter configured to receive pixel signals from the pixel array and to generate a first 1-bit digital signal and a second 1-bit digital signal;
  a memory configured to store the first 1-bit digital signal and the second 1-bit digital signal;
  a signal processor configured to generate a first weighted signal in response to the first 1-bit digital signal and the second 1-bit digital signal, the first weighted signal having one of levels of more than two different levels;
  a comparator configured to generate a first output signal in response to the first weighted signal and a first reference signal,
  wherein the signal processor is further configured to:
    receive the first 1-bit digital signal from a first address in the memory and the second 1-bit digital signal from a second address in the memory
    compare the first 1-bit signal with the second first 1-bit signal, and
    generate the first weighted sum signal based on a result of the comparison between the first 1-bit signal and the second 1-bit signal.

10. The image sensor of claim 9, wherein the signal processor configured to generate a second weighted signal in response to the first 1-bit digital signal and the second 1-bit digital signal, the second weighted signal having one of the levels of more than two different levels.

11. The image sensor of claim 10, wherein the signal processor configured to generate the second weighted signal in response to the first 1-bit digital signal and the second 1-bit digital signal, the second weighted signal having one of 3 different levels.

12. The image sensor of claim 9, wherein the comparator configured to generate the first output signal in response to the first weighted signal and at least two different reference signals.

13. The image sensor of claim 9, wherein the first and second 1-bit digital signals are generated based on the same pixel in the pixel array.

14. The image sensor of claim 9, wherein the first 1-bit digital signal is generated based on a first pixel in the pixel array and the second 1-bit digital signal is generated based on a second pixel in the pixel array, and
  wherein the first pixel is different from the second pixel.

15. The image sensor of claim 1, wherein the signal generator generates the first weighted sum signal by combining the N number of 1-bit signal among the first digital signals.

16. The image sensor of claim 9, wherein the signal generator generates the first weighted sum signal by combining the first 1-bit digital signal and the second 1-bit digital signal.

17. An image sensor comprising:
  a memory configured to store first digital signals generated based on pixel signals;
  a signal generator configured to generate a weighted sum signal based on N number of 1-bit signal among the first digital signals stored in the memory;
  a comparator configured to generate a second digital signal in response to the weighted sum signal,
  wherein the weighted sum signal has one of levels of more than N different levels, and wherein N is a natural number,
  wherein the signal generator is further configured to:
    receive the N number of 1-bit signal among the first digital signals from the memory,
    compare a first 1-bit signal received from a first address in the memory with a second first 1-bit signal received from a second address in the memory, and
    generate the weighted sum signal based on a result of the comparison between the first 1-bit signal and the second 1-bit signal.

* * * * *